(12) United States Patent
Goldman et al.

(10) Patent No.: US 10,015,213 B2
(45) Date of Patent: Jul. 3, 2018

(54) INTERACTIVE ORGANIZATION OF COMMENTS ON AN ONLINE SOCIAL PLATFORM

(71) Applicant: Renaissance Learning, Inc., Wisconsin Rapids, WI (US)

(72) Inventors: Andrew Goldman, Pacific Palisades, CA (US); Todd Allen Robertson, Pacific Palisades, CA (US); Andrew John Storey Cooper, Deception Bay (AU); Rachel Schall Thomas, Palo Alto, CA (US); Adam Iarossi, Victoria (AU)

(73) Assignee: RENAISSANCE LEARNING, INC., Wisconsin Rapids, WI (US)

( * ) Notice: Subject to any disclaimer, the term of this patent is extended or adjusted under 35 U.S.C. 154(b) by 44 days.

(21) Appl. No.: 13/902,572

(22) Filed: May 24, 2013

(65) Prior Publication Data

US 2013/0339443 A1 Dec. 19, 2013

Related U.S. Application Data

(60) Provisional application No. 61/651,491, filed on May 24, 2012.

(51) Int. Cl.
*G06F 15/16* (2006.01)
*H04L 29/06* (2006.01)
(Continued)

(52) U.S. Cl.
CPC .......... *H04L 65/403* (2013.01); *G06Q 10/10* (2013.01); *G06Q 50/01* (2013.01); *H04L 51/32* (2013.01)

(58) Field of Classification Search
CPC ........ G06Q 10/10; G06Q 50/01; G06F 21/10; H04L 63/20; H04L 51/32; H04L 65/403; H04N 21/2541
(Continued)

(56) References Cited

U.S. PATENT DOCUMENTS 6,732,148 B1 * 5/2004 Estrada et al. ................ 709/205
7,698,367 B2 * 4/2010 Mason et al. ................ 709/206
(Continued)

OTHER PUBLICATIONS

International Search Report and Written Opinion for PCT/US2013/042758, dated Nov. 12, 2013, 11 pages.
(Continued)

*Primary Examiner* — Anthony Mejia
*Assistant Examiner* — Dixon Dabipi

(57) ABSTRACT

An interactive organization architecture and application platform and methods for use with social reading systems and networks are disclosed for permitting users to interact while viewing the pages of electronic content, for example, a book. Users may highlight text and attach a comment, link, poll, or quiz to the text of the electronic content. As other readers peruse through the electronic content, they are either presented with the notes as they read or are presented with aggregated notes in their feed, which may be determined as relevant based on predetermined criteria. Users may share content with others in multiple private and public discussion threads. The social reading platform system and methods also include other features that facilitate discovery, collaborative reading, assignment of tasks, review of tasks by teachers and peers etc.

24 Claims, 13 Drawing Sheets

(51) Int. Cl.
*G06Q 10/10* (2012.01)
*G06Q 50/00* (2012.01)
*H04L 12/58* (2006.01)

(58) Field of Classification Search
USPC .................. 709/204, 206; 705/14.23, 305
See application file for complete search history.

(56) References Cited

U.S. PATENT DOCUMENTS

| | | | |
|---|---|---|---|
| 7,761,591 B2* | 7/2010 | Graham | 709/233 |
| 7,788,647 B2 | 8/2010 | Martin et al. | |
| 8,060,489 B1* | 11/2011 | Raman | G06F 17/30997 707/706 |
| 2004/0030697 A1* | 2/2004 | Cochran | G06F 17/30861 |
| 2008/0168146 A1* | 7/2008 | Fletcher | H04L 51/36 709/206 |
| 2009/0319910 A1 | 12/2009 | Escapa et al. | |
| 2010/0092095 A1 | 4/2010 | King et al. | |
| 2010/0287236 A1* | 11/2010 | Amento et al. | 709/204 |
| 2011/0035329 A1* | 2/2011 | Delli Santi et al. | 705/347 |
| 2011/0246574 A1* | 10/2011 | Lento et al. | 709/204 |
| 2012/0109836 A1 | 5/2012 | Chen et al. | |
| 2012/0151351 A1* | 6/2012 | Kilroy | G06Q 30/02 715/733 |
| 2012/0324392 A1* | 12/2012 | Mbenkum et al. | 715/776 |
| 2012/0329029 A1* | 12/2012 | Rauta | 434/350 |
| 2013/0198273 A1* | 8/2013 | Vago | A63F 13/12 709/203 |
| 2014/0006517 A1* | 1/2014 | Hsiao | G06Q 50/01 709/205 |
| 2015/0350151 A1* | 12/2015 | Graham | G06Q 50/01 709/206 |

OTHER PUBLICATIONS

Extended European Search Report for European Patent Application No. 13793624.1 dated Jan. 18, 2016, 8 pages.

* cited by examiner

DISCUSSIONS      Viewing: Most Recent

Mark as Read

| Book XYZ | Peter S.<br>Points 1320 | Votes 7 | Notes 41 | Friends 5<br>*XYZ* | Share with Group |

" And you may as well throw in our mothers, too, because how would they live without us? "
    -From 1

Comment posted on March 13     Vote (0) • Flag • Edit

Young adult literature tends to work best when the parents are absent like this; unreliable, dead, or forgotten parents allow our protagonists to fend for themselves and find their own power. If they could rely on their parents, there'd be no narrative.

1022                   1026     1020
REPLIES: Public    Alex's Second Group

Shared by Alex A. a moment ago     Vote (0) • Flag • Edit
Please join me in this discussion.

REPLY NOW

Mark as Read

| Book ABC | Alex A.<br>Points 1320 | Votes 7 | Notes 41 | Friends 5<br>*ABC* | Share with Group |

" But in an antitrust context, social book instant dominance in photo sharing looks like something more troubling: a company using its clout in one field to squash competition in another. "
    -From Content                    View Text in Book >>

INTERACTIVE ORGANIZATION OF COMMENTS ON AN ONLINE SOCIAL PLATFORM

CROSS-REFERENCE TO RELATED APPLICATIONS

This application claims the benefit under 35 U.S.C. § 119(e) of U.S. Provisional Patent Application No. 61/651,491, entitled "Interactive Organization of Comments on an Online Social Platform" filed May 24, 2012, the entire contents of which are incorporated herein by reference.

BACKGROUND

1. Field of the Invention

The present invention relates to viewing and sharing of electronic content (e.g., books, notes associated with a particular section of book, etc.) on electronic shared platforms, for example, social platforms. More particularly, the present invention relates to an asynchronous social reading platform application that allows people to interact in the pages of a book and methods for interactive organization of comments on an asynchronous social reading platform.

2. Description of the Related Art

The popularity and use of the Internet and shared networks that facilitate viewing of electronic content and social communications has increased dramatically in recent years. Users communicate their thoughts and comments on subjects of interest to them with others via the internet and shared networks. Yet, current solutions for holding private conversations around public content are fairly limited. On some social networks, private conversations or communications are accomplished by duplicating the "root" (first) entry, thereby separating all conversations in a given flow in a manner that can make them difficult to manage. On some social network platforms, private communications may be accomplished by moving a particular conversation thread into a private group or adding a private conversation into a particular news-feed entry. A current solution that exists duplicates the entry again and moves the entry into multiple locations. On most news sites, users can only comment on an article by submitting their comments into a public stream or by breaking them off from the news site all together.

In a similar vein, public and private discussion threads among users in a social network occur on separate channels of communication. This is a major complaint with existing social networks.

There is a need in the industry for a system and methods that allow multiple threads of communication among users that may be public or private that can occur in parallel.

SUMMARY

The present technology overcomes the deficiencies and limitations of prior systems and methods, at least in part by, providing interactive organization architecture for social or other platforms that facilitate reading of content, applications, and methods that permit users to interact while viewing or reading electronic content, for example, a book. The interactive organization architecture for use with social reading platforms in accordance with the present invention is a significant improvement over the current state of the art.

In some implementations, interactive organization architecture for use with social reading platforms and methods are configured to permit users to highlight text and attach a comment, link, poll, or quiz to the text of the electronic content. As other readers peruse through the electronic content, they are either presented with the notes as they read or are presented with aggregated notes in their social feed, which may be determined as relevant based on predetermined criteria. The interactive organization architecture for social reading platforms may include a feed search algorithm configured to account for relevant factors that may be predefined, including the timeless nature of embedded comments, a particular reader's current position in the electronic content the particular reader is consuming, the electronic content's author's status in the community, the particular reader's relationship to the author of the electronic content that the particular reader is reading, etc.

In some implementations, the interactive organization architecture for social reading platforms and methods determine relevance based on a social graph, which may be imported from one or more social network applications. In some implementations, the social reading platform may have an application ("app") that is formulated for prioritizing content from those with whom a particular user shares an affinity.

In some implementations, a rating and ranking system may distribute high quality content to others to enable them to discover other members of a community who are making high quality contributions.

In some implementations, the interactive organization architecture for social reading platforms include a mechanism for bundling a group of notes and creating a layer of "expert" content associated with the electronic content that is being read or viewed. The expert content provides a particular context or direction, for example, a historical context, an author's process, "book club" discussions etc. Users may subscribe to this expert layer.

In some implementations, the interactive organization architecture for social reading platforms and methods of operation also include other features and aspects that facilitate discovery, collaborative reading, assignment of tasks, review of tasks by teachers and peers etc.

In some implementations, the interactive organization architecture for social reading platforms include a mechanism for sharing content with others, having branched private discussions in a given hierarchy without duplicating the hierarchy above it.

The interactive organization architecture for social reading platforms includes a book discovery system configured to allow readers to browse to their friend's shelves, and discover books that may be of interest to them. In yet other implementations, the book discovery system is configured to formulate and present invitations by a particular reader to other readers to join in reading the book. A reading invitation generates a form that includes the book information and a personal note which is sent to the recipient via email, via the "app" or through social media. When a recipient of an invitation accepts the invitation, a sample of the book or other electronic content is automatically added to his or her bookshelf and a reading relationship is established between the reader issuing an invitation and the recipient.

In some implementations, the interactive organization architecture for social reading platforms may be configured to provide sharing of content with or among a group and facilitating branched private discussions from any point in a particular discussion hierarchy without duplicating the hierarchy leading to the particular discussion. This capability permits individual readers to conduct private discussions inside or within their main news feed. As one example, teachers may enter a note once and then discuss it in smaller groups. As yet another example, a business person may use these private discussion channels when sharing an article of interest among a select few that may merit private viewing and comments. As another example, an ordinary consumer may wish to discuss something he or she finds online and of interest with family or a group of friends. As yet another example, in a legal scenario, every time a lawyer or an attorney makes a note, he or she can easily share it with other members in his or her legal team. An additional benefit is that the law firm retains the intellectual property that is created as the lawyer or attorney reads the note and can save it for subsequent consideration.

The system and methods disclosed below may be advantageous in a number of respects. They provide a significant improvement over existing systems and other solutions that exist that either duplicate conversation threads or move the conversation thread to different channels of communication.

BRIEF DESCRIPTION OF THE DRAWINGS

The present invention is illustrated by way of example, and not by way of limitation in the figures of the accompanying drawings in which like reference numerals are used to refer to the same or similar elements.

FIG. 10B is an example graphical user interface illustrating multiple window displays indicating a private discussion thread and sharing of content among users of the interactive organization application for use with social reading platforms in parallel with public discussion threads.

FIG. 10C is an example graphical user interface illustrating multiple window displays indicating several private discussion threads and sharing of content among users of the interactive organization application for use with social reading platforms in parallel with one or more public discussion threads.

DETAILED DESCRIPTION

Figure 1:
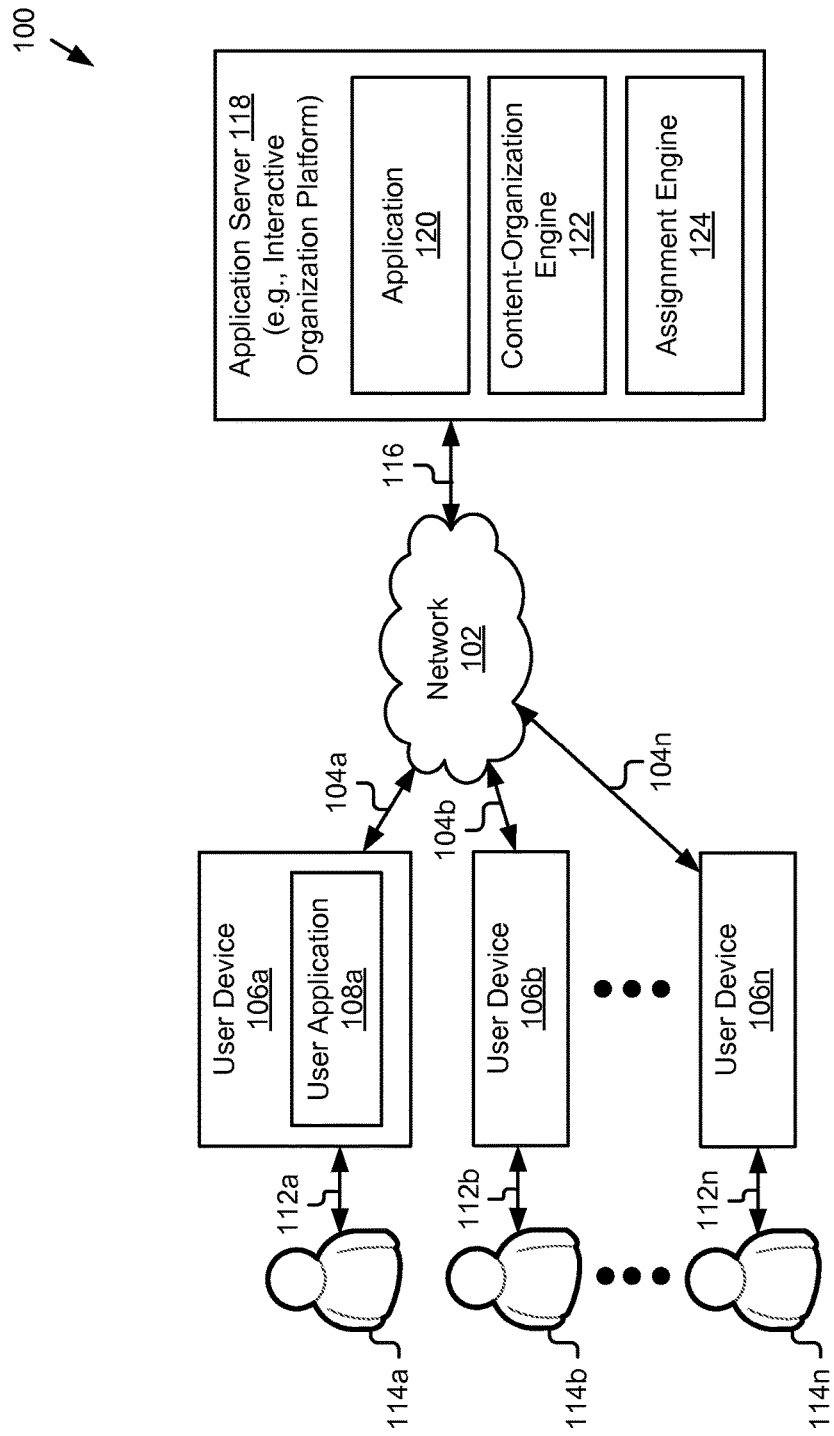
FIG. 1 is a high-level block diagram illustrating example interactive organization architecture for use with social reading platforms in accordance with the present invention.

The systems and methods of this technology are directed to an interactive organization application and architecture for use with asynchronous social reading platforms and configured to allow people to interact within the pages of a book or other electronic content as they view, read or otherwise consume the book or other electronic content. The interactive organization application and architecture for use with social reading platforms is configured to permit a user or reader to highlight particular text (for example, of interest) and attach a comment, link, poll query, or quiz to the highlighted text, creating an embedded "note." As other readers peruse through the book or other electronic content, they will discover the note, or if they are further ahead in the book they will discover this note in their feed, which may be configured to aggregate relevant notes based on a number of criteria that may be defined. In some implementations, a "feed search" algorithm may be designed or configured to account for the timeless nature of this embedded content, a particular reader's current position in content being reviewed, the author's status in the community as well as the reader's relationship to the author. In an example scenario, a particular note posted on page 50 of a particular book a year ago will surface and be presented when a new user turns to page 50 in that particular book. Additionally, the users will not see the note in their feed until they have read past it in their books. This prevents users or readers from seeing spoilers. In some implementations, relevance of notes may be based on or tied to a social graph associated with a reader. In some instances, a social graph may be imported from one or more social network applications. In other instances, a social graph may be built into an application (or "app"), which is configured for prioritizing content from people with whom a particular reader shares an affinity. In some implementations, a rating and ranking system may be configured to push high-quality content for broader distribution such that users can discover other members of a particular community who are making high-quality contributions. Finally, the interactive organization application and architecture for use with social reading platforms may include a mechanism or capabilities configured for bundling up a group of notes and allowing people to subscribe to them as an "Extra". These "Extras" are generally a layer of expert content that may be formulated and located in a layer that is configured to sit above a book, to provide greater depth and meaning and to enrich it in a particular direction. As one example, the expert content may provide a historical context. As yet another example, the expert content may enlighten readers on the author's process. As still another example, the expert content may inform about book club discussions or may take any number of other directions.

In some implementations, the interactive organization architecture and application for use with social reading platforms is either configured to include or support a book or other electronic content discovery system, which may allow readers to browse through their friend's shelves and discover books or other electronic content that may be of interest to them. The interactive organization architecture and application for use with social reading platforms may include a system or capability for inviting other readers to join in or collaborate in reading a particular book. A reading invitation or invite extended by a particular reader to others may generate a form that includes the book information and a personal note, which may be sent to a designated recipient either via an email, in an "app" or through social media or networks. When the designated recipient accepts the invite or invitation, a sample of the book or other electronic content is automatically added to the recipient's bookshelf and a reading relationship between the sender and the recipient is thereby established and recorded by the system.

The interactive organization architecture and application for use with social reading platforms also provides a mechanism by which users and readers may share content with a group and conduct branched or side private discussions from any point in a discussion hierarchy without duplicating the hierarchy that leads to that point. This aspect permits an individual to carry on private discussions inside their main news feed, which is a significant improvement over other systems that either duplicate or move the conversation to different channels. This allows teachers to enter a note once and then discuss or elaborate on it in smaller groups. A business person may use these private discussion channels when sharing an article of interest that may merit private conversation. Likewise, an ordinary consumer may use this capability to discuss a topic of interest that they found online with family or a group of friends.

Some portions of the detailed descriptions that follow are presented in terms of algorithms and symbolic representations of operations on data bits within a computer memory. These algorithmic descriptions and representations are the means used by those knowledgeable in the data processing arts to most effectively convey the substance of their work to others in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present technology also relates to an apparatus, platform, or system for performing the operations described. This apparatus, platform, or system may be specially constructed for the required purposes, or it may comprise one or more general-purpose computers (in a distributed architecture or otherwise) selectively activated or reconfigured by one or more computer programs stored in the computers. Such a computer program may be stored in a computer readable storage medium, such as, but not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The present technology may take the form of an entirely hardware embodiment, an entirely software embodiment or an implementation containing both hardware and software elements. In some implementations, this technology is implemented in software, which includes but is not limited to, firmware, resident software, microcode, etc.

Furthermore, this technology may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented here are not inherently related to any particular computer or other apparatus. Various general-purpose systems may be used with programs in accordance with the teachings herein, or it may prove convenient to construct more specialized apparatuses to perform the required method steps. The required structure for a variety of these systems will appear from the description below. In addition, the present invention is not described with reference to any particular programming language. It will be appreciated that a variety of programming languages, for example, high level programming languages such as "C," "Java," or "Pascal," may be used to implement the teachings of the technology as described herein. The computers may be specially programmed, and be configured with special purpose hardware. Each computer may have a single processor, a multiprocessor or may comprise multiple computers, each of which may include a single processor or a multiprocessor, operably connected over a computer network (one or more). Each computer may be controlled by one of a variety of operating systems including Microsoft Windows, Macintosh, Linux, Unix, or a Java-based operating system, to name a few.

Each computer in the system may include one or more input and output (I/O) units, a memory system, and one or more processing units. The input-output ("I/O") units of each computer may be connected to various input/output devices, such as a mouse, keyboard, video card (video monitor), sound card (with speakers), network card, and printer. The memory system in a typical, general purpose, computer system, which usually includes a computer readable and writeable nonvolatile recording medium, of which a magnetic disk, a flash memory and tape are some examples. The memory system operably holds the operating system, utilities, and application programs. It should also be understood that the invention is not limited to the particular input devices, output devices, or memory systems used in combination with the computer system or to those described herein. Nor should the invention be limited to any particular computer platform, processor, or high-level programming language.

Interactive Organization Architecture/Application Platform Overview

FIG. 1 illustrates a high-level block diagram of example system architecture for an interactive organization application for use with asynchronous social reading platforms (or networks), indicated generally by reference numeral 100 facilitating interactions by readers within the pages of a book or electronic content they are reading and organization of notes or comments. The interactive organization application for use with asynchronous social reading platforms may be configured with an application server 118 comprising an application 120, a content-organization engine 122 and an assignment engine 124. A plurality of users 114a, 114b, through 114n may access the application server 118 via their user devices 106a, 106b, through 106n, respectively. Each of the user devices 106a, 106b, through 106n has a user application as indicated by reference numeral 108a in the user device 106a. One or more of the users 114a, 114b, through 114n may communicate with the application server 118 via their user devices 106a, 106b, through 106n, as illustrated by signal lines 112a, 112b, through 112n. The user application 108a may be a web browser for accessing a web-based version of the social reading application or a stand-alone application configured to access a native application. The user (114a-114n) may navigate to a web page via the user application 108a to view electronic content or read a particular book. The browser may be any one of Chrome, Safari, Firefox, Internet explorer or the like. The user devices 106a, 106b, through 106n are coupled to a network 102 via signal lines 104a, 104b, through 104n. The network 102 is coupled to the application server 118 via a signal line 116. The signal lines illustrated in this diagram are intended to illustrate flow of communication or interactions among the system components illustrated. The user devices 106a through 106n in FIG. 1 are illustrated as examples.

Although FIG. 1 illustrates only these three user devices, the present disclosure applies to any system architecture having one or more user devices 106 therefore any number of user devices 106 may be used. Furthermore, while only one network 102 is illustrated as coupled to the user devices 106a through 106n, and the application server 118, in practice, any number of networks 102 may be connected to these entities.

In some implementations, the network 102 may be of conventional type, wired or wireless, and may have any number of configurations such as a star configuration, token ring configuration or other configurations recognized by those skilled in the art. In some implementations, the network 102 may also represent use of mobile applications designed to operate on smartphones, tablet computers, and other mobile devices. The mobile applications may be available through application distribution platforms, operated by the owners of the mobile applications or others. These mobile applications may be downloaded from the distribution platforms to target devices. In some implementations, the network 102 may comprise a local area network (LAN), a wide area network (WAN) (e.g., the Internet), and/or any other interconnected data path across which multiple devices may communicate. In some implementations, the network 102 may be a peer-to-peer network. The network 102 may also be coupled to or include portions of a telecommunications network for sending data in a variety of different communication protocols. In yet other implementations, the network 102 may include Bluetooth communication networks or a cellular communications network for sending and receiving data such as via short messaging service (SMS), multimedia messaging service (MMS), hypertext transfer protocol (HTTP), direct data connection, WAP, email, etc.

The application server 118 comprises the software routines and instructions to operate the interactive organization platform for use with social reading networks 100 and its functions and operations. Although only one application server 118 is described here, multiple servers may be present, each with functionality that is similar or different.

Figure 2:
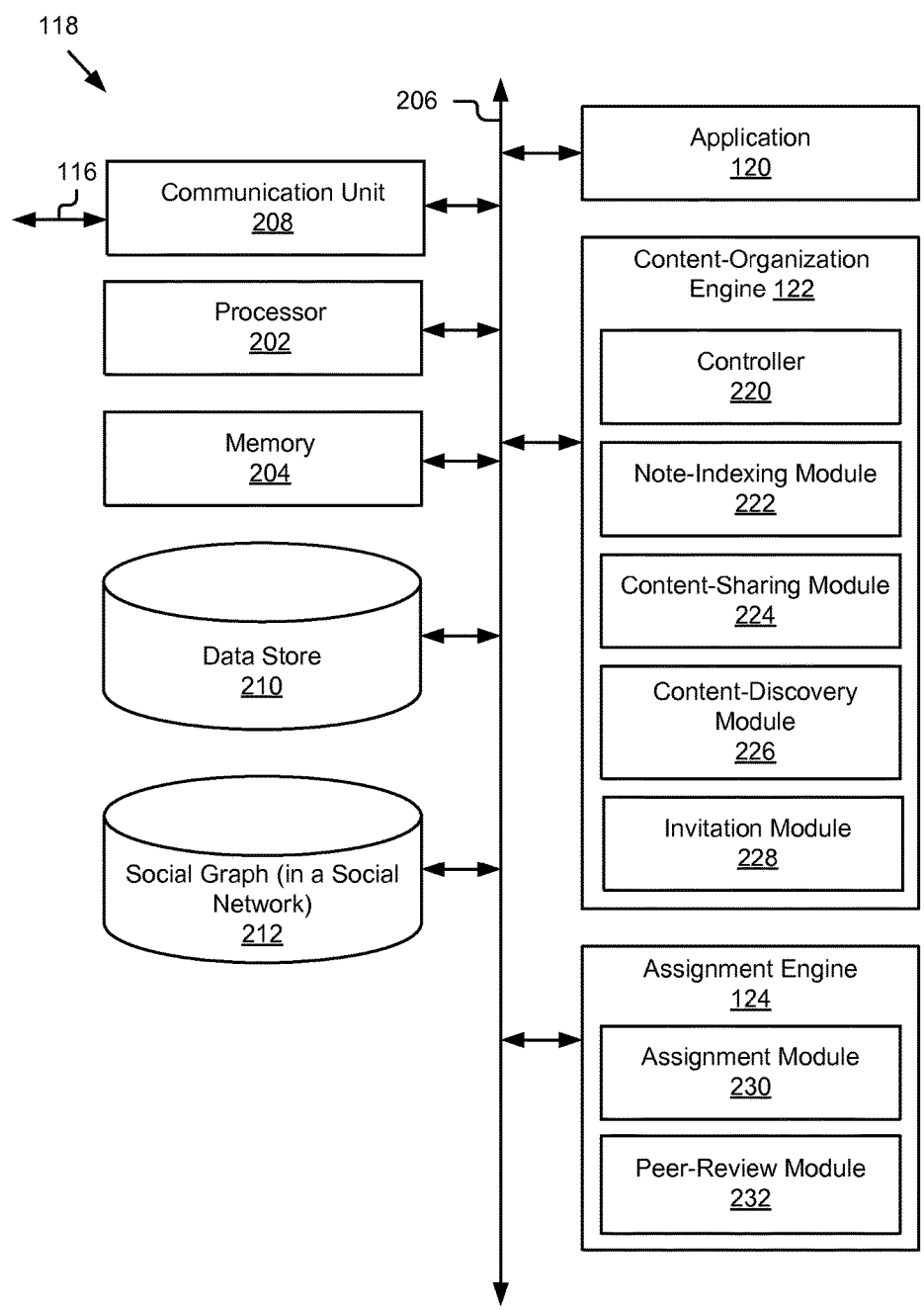
FIG. 2 is a block diagram illustrating example hardware and software components of the example interactive organization architecture for use with social reading platforms including a content-organization engine and an assignment engine.

FIG. 2 illustrates some implementations of the hardware architecture of the application server 118 with the software capabilities within some of the hardware components. In FIG. 2, like reference numerals have been used to reference like components with the same or similar functionality that has been described above with reference to FIG. 1. For the components that have been described above, the description is not repeated here. As depicted in FIG. 2, the application server 118 includes a processor 202, a memory 204, data storage 210, and a communication unit 208, all of which may be communicatively coupled to a system bus 206.

The processor 202 processes data signals and program instruction received from the memory 204 and the data storage 210. The processor 202 comprises an arithmetic logic unit, a microprocessor, a general purpose controller or some other processor array to perform computations and provide electronic display signals to a display device. The processor 202 is coupled to the bus 206 for communication with the other components. The processor 202 may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. It will be obvious to one skilled in the art that other processors, operating systems, sensors, displays, and physical configurations than those that are illustrated may be used to perform the operations described in this specification.

The memory 204 may be a non-transitory storage medium. The memory 204 stores the instructions and/or data for operating the application server 118, which may be executed by the processor 202. In one implementation, the instructions and/or data stored in the memory 204 comprises code for performing any and/or all of the techniques or functionalities that are described in this specification. The memory 204 may be a dynamic random access memory (DRAM) device, a static random access memory (SRAM) device, flash memory or some other memory device known in the art.

The data storage 210 stores the data and program instructions that may be executed by the processor 202. In one implementation, the data storage 210 may store the data of various types of users in the web forum. The data storage 210 may include a variety of non-volatile memory permanent storage device and media such as a hard disk drive, a floppy disk drive, a CD-ROM device, a DVD-ROM device, a DVD-RAM device, a DVD-RW device, a flash memory device, or some other non-volatile storage device known in the art.

The communication unit 208 facilitates the communication between the user device 106 (in FIG. 1) and the application server 118 over the network 102 (in FIG. 1). For example, a user 114a, via the user device 106a, may access the application server 118 to view or read electronic content and otherwise interact with the application server 118 (configured to provide access to the interactive organization platform for use with social reading platforms 100) and receive information from the server application server 118 via the communication unit 208. The communication unit 208 also displays the content or information either received from or hosted on the server 118 to any of the users 114a through 114n.

The communication unit 208 couples the application server 118 to the network 102 by the signal line 116 (in FIG. 1) and via the bus 206. The communication unit 208 may include network interface modules, which include ports for wired connectivity such as but not limited to USB, SD, or CAT-5, etc. The network interface modules are configured to link the processor 202 to the network 102 that may in turn be coupled to other processing systems. The network 102 (FIG. 1) may comprise a local area network (LAN), a wide area network (WAN) (e.g., the Internet), and/or any other interconnected data path across which multiple devices may communicate. The network interface modules are configured to provide conventional connections to the network 102 using standard network protocols such as TCP/IP, HTTP, HTTPS and SMTP as well as any others that are understood to those skilled in the art. The network interface modules include a transceiver for sending and receiving signals using WIFI, Bluetooth® or cellular communications for wireless communication.

FIG. 2 also illustrates a social graph 212, which may relate to any or all of the users, 114a through 114n. The term "social graph" as used in this specification encompasses its plain and ordinary meaning including, but not limited to, a set of online relationships between users, such as provided by one or more social networking systems or platforms, such as one accessed by the interactive organization platform 100 for use with social networks, including explicitly-defined relationships and relationships implied by social connections with other online users, where the relationships form a social graph. In some examples, the social graph 112 may reflect a mapping of these users and how they are related.

FIG. 2 also illustrates the application 120, the content-organization engine 122, and the assignment engine 124. The content-organization engine 122 includes a controller 220, a note-indexing module 222, a content-sharing module 224, a content-discovery module 226, and an invitation module 228. The assignment engine 124 includes an assignment module 230 and a peer-review module 232. The content-organization engine 122 is configured to create, insert, place or other embed notes (e.g., a comment, link, poll query, or quiz) to the highlighted text and aggregate notes based on predefined criteria with the controller 220. The note-indexing module 222 is configured to index the notes as they are aggregated. The content-sharing module 224 is configured to share content with other users designated by a reader based on affinity or as designated by the reader. The content-discovery module 226 is configured to enable users or readers to browse through "reading shelves" or lists compiled by other users to discover materials of interest to them. These materials may also be compiled from procedural lists of trending books and articles. In some implementations, the content-discovery module 226 may be configured to formulate and present invitations by a particular reader to other readers to join in reading, for example, a particular book. These operations are performed by the invitation module 228. The invitation module 228 generates a form that includes the book information and a personal note which is sent to the recipient via email, via an "app" or through social media. When a recipient of an invitation accepts the invitation, a sample of the book or other electronic content is automatically added to his or her "bookshelf" and a reading relationship is established between the reader issuing an invitation and the recipient.

The assignment engine 124 is configured to facilitate assigning tasks or assignments by one user for other users. As one example, a teacher may use this platform and functionality to assign an assignment to a restricted set of users (students). Assignments are indexed into the text as opposed to set to a page position, which enables members to have different editions of the book and still get synchronized assignments. The teacher may receive answers to the assignment from the students, grade them, provide feedback to the students, or the like. The assignment module 230 may be configured to formulate one or more assignments as desired by the teacher. In other examples, an authority figure at an organization may also use this aspect. In some instances, review of answers may be conducted by peers (for example, at school or in the organization), in which instance these peer reviews are facilitated by the peer-review module 232. Each of the modules and engines described above may include software or program instructions configured to perform the functionalities described.

Figure 3:
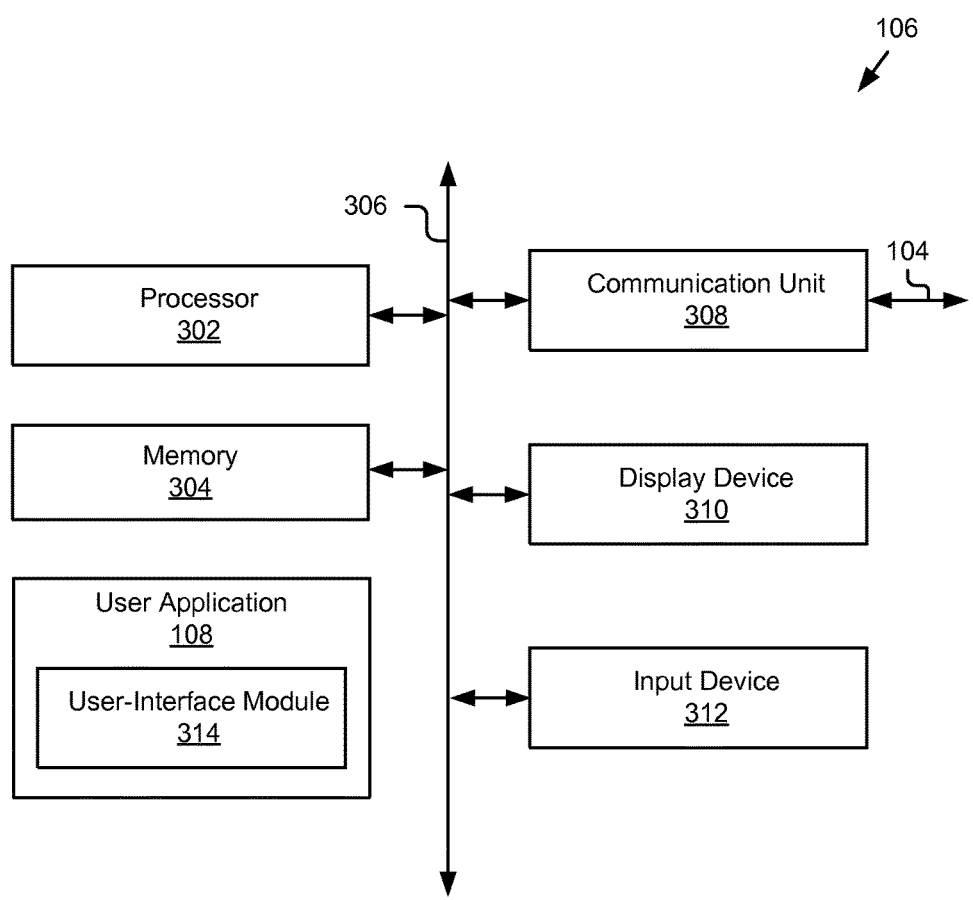
FIG. 3 is a block diagram illustrating example hardware and software components of the user device configured to interact with the example interactive organization architecture for use with social reading platforms.
Figure 4:
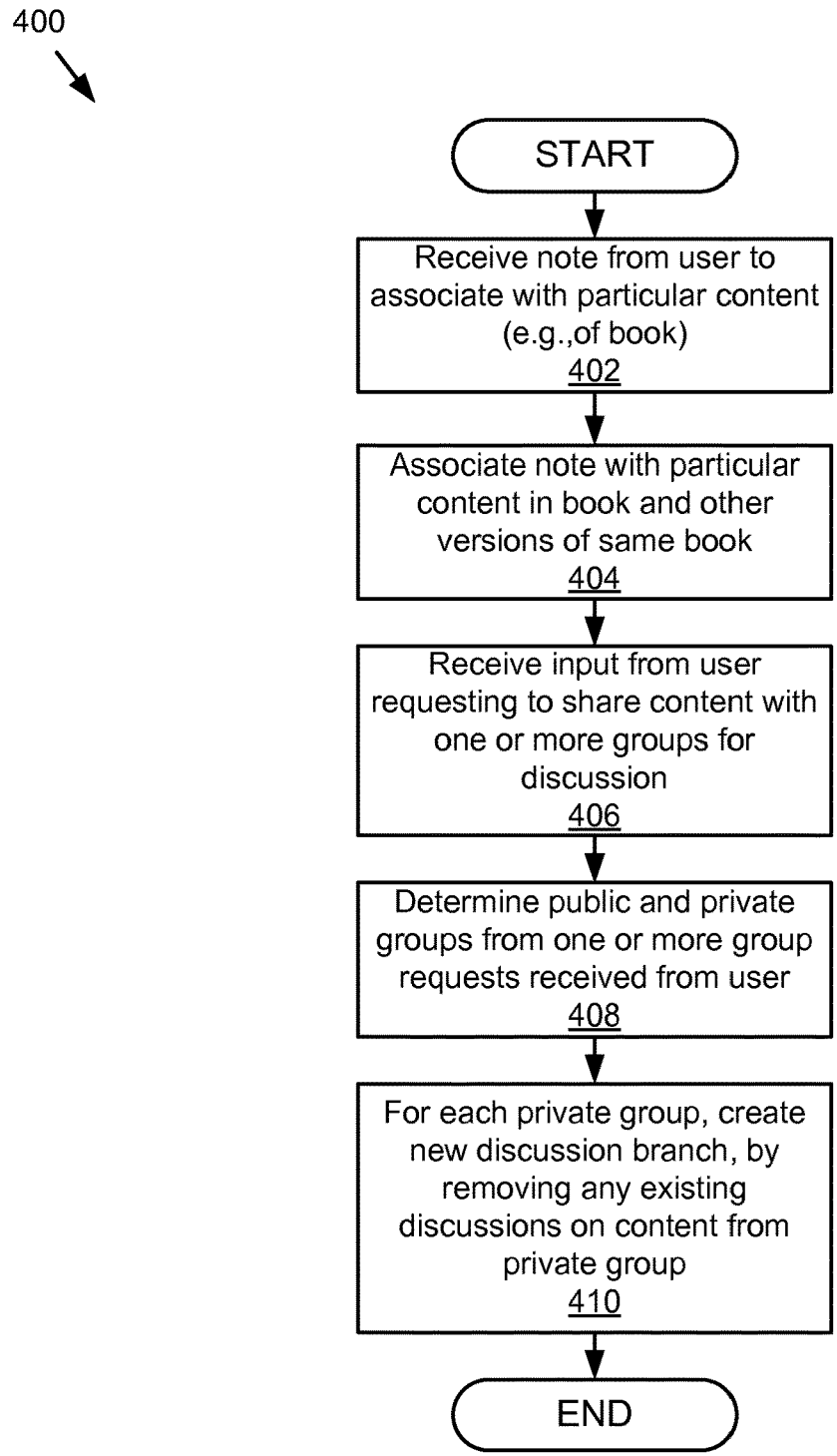
FIG. 4 is a flow chart of an example method of associating notes created by users or readers to a particular content as designated and selectively sharing the particular content with one or more groups (public, private, or both in parallel) that are designated.

Referring now to FIG. 3, an example implementation of the user device 106 is illustrated. The user devices 106a through 106n can be a computing device, for example, a laptop computer, a desktop computer, a tablet computer, a mobile telephone, a personal digital assistant (PDA), a mobile email device, a portable game player, a portable music player, a television with one or more processors embedded in the television or coupled to it, or any other electronic device capable of accessing a network. The user device 106 includes a processor 302, memory 304, a communication unit 308, a display device 310, an input device 312, and the user application 108 including a user interface module 314 configured to facilitate interactions with the application server 118.

Methods/Operations Overview

FIGS. 4-9 illustrate flow charts of the methods and/or operations that may be performed on the interactive organization application platform 100 by the application server 118. It should be understood that the order of the operations illustrated is by way of example. This order may be changed or certain operations may be eliminated. In addition, the "START" and "END" designations in each of the flow charts are merely for designating when the illustrated group of operations (formulated as a routine or subroutine) either begins or ends. This should not be construed as a beginning or end of the entire system operations. Referring now to FIG.

4, the methods and operations indicated generally by reference numeral 400 begin and proceed to block 402, including one or more operations for receiving a note from a user or reader to associate with particular content, for example, a book, at the desired location within the page of the book. The desired location may be indicated by highlighting the particular text of interest to which the user or reader's note pertains. From there, the methods and operations 400 proceed to the block 404 including one or more operations for associating the note to the particular content of the book, designated by highlighted text or otherwise and other versions of the same book (hosted a server associated with the interactive organization platform 100 by the application server 118). The methods and operations 400 proceed to the next block 406 including one or more operations configured to receive input from the user or reader who created the note to share the content with one or more other readers or users of a group (for discussion) with access to the interactive organization platform 100 associated with or providing access to social reading platforms. The one or more readers or users may be identified by the particular reader wishing to share the content in various ways or automatically based on the reader's social graph or map of friends. The methods and operations 400 proceed to the next block 408, at which stage, the system or platform 100 identifies public and private groups from the one or more requests received from the reader or user. The methods and/or operations 400 proceed to the next block 410, at which point, for each private group identified, the system or platform 100 creates a new discussion branch or thread by removing any existing discussions on content for viewing by the private group. The stream of notes that is presented to the persons in the private group is tailored for private viewing. This enables side discussions among persons of the group that are restricted from viewing by members that are not members of the private group.

Figure 5:
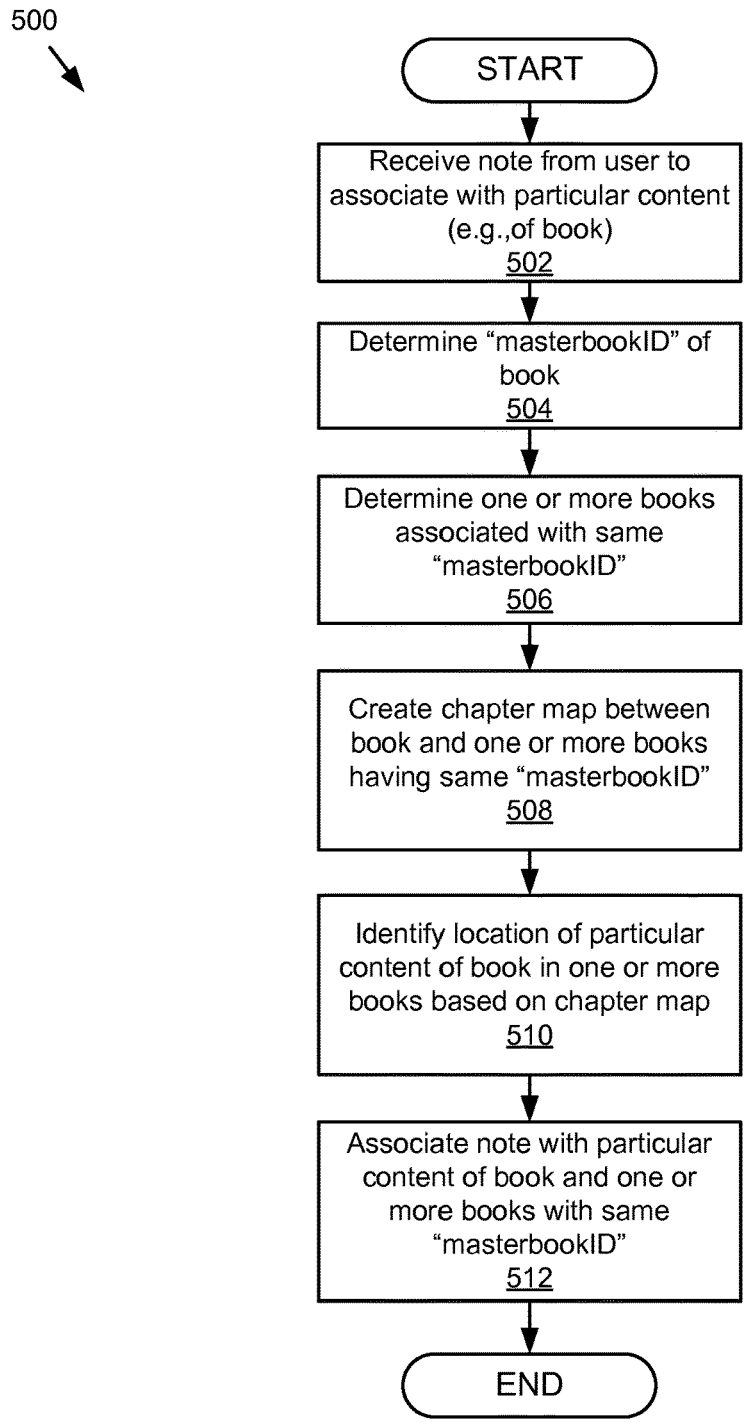
FIG. 5 is a flow chart of an example method of associating notes created for a particular content created of a particular book with all versions of that particular book based on use of a "masterbookID" and a chapter map.

Referring now to FIG. 5, in some implementations, the methods and operations indicated generally by reference numeral 500, begin and proceed to block 502, including one or more operations for receiving a note from a user or reader to associate with particular content, for example, a particular book, at the desired location within the page of the book. The desired location may be indicated by highlighting the particular text of interest to which the user or reader's note pertains. From there, the methods and operations 500 proceed to the next block 504, which represents one or more operations for determining a "masterbookID" of the particular book. The methods and operations 500 proceed to the next block 506, at which point the system or interactive organization platform 100 for use with social reading platforms determines one or more books that are associated with the same "masterbookID." The methods and operations 500 proceed to the next block 508 including one or more operations for creating a chapter map between the book and one or more books that share the same "masterbookID." From there, the methods and operations 500 proceed to the next block 510 including one or more operations for identifying the location (e.g. coordinates) of the particular content of the particular book in one or more other versions of the book that are identified based on the chapter map. The methods and operations 500 proceed to the next block 512, at which point, the note is associated with the particular content of the book to which the note pertains and any other version of the book that is identified based on the masterbookID.

Figure 6:
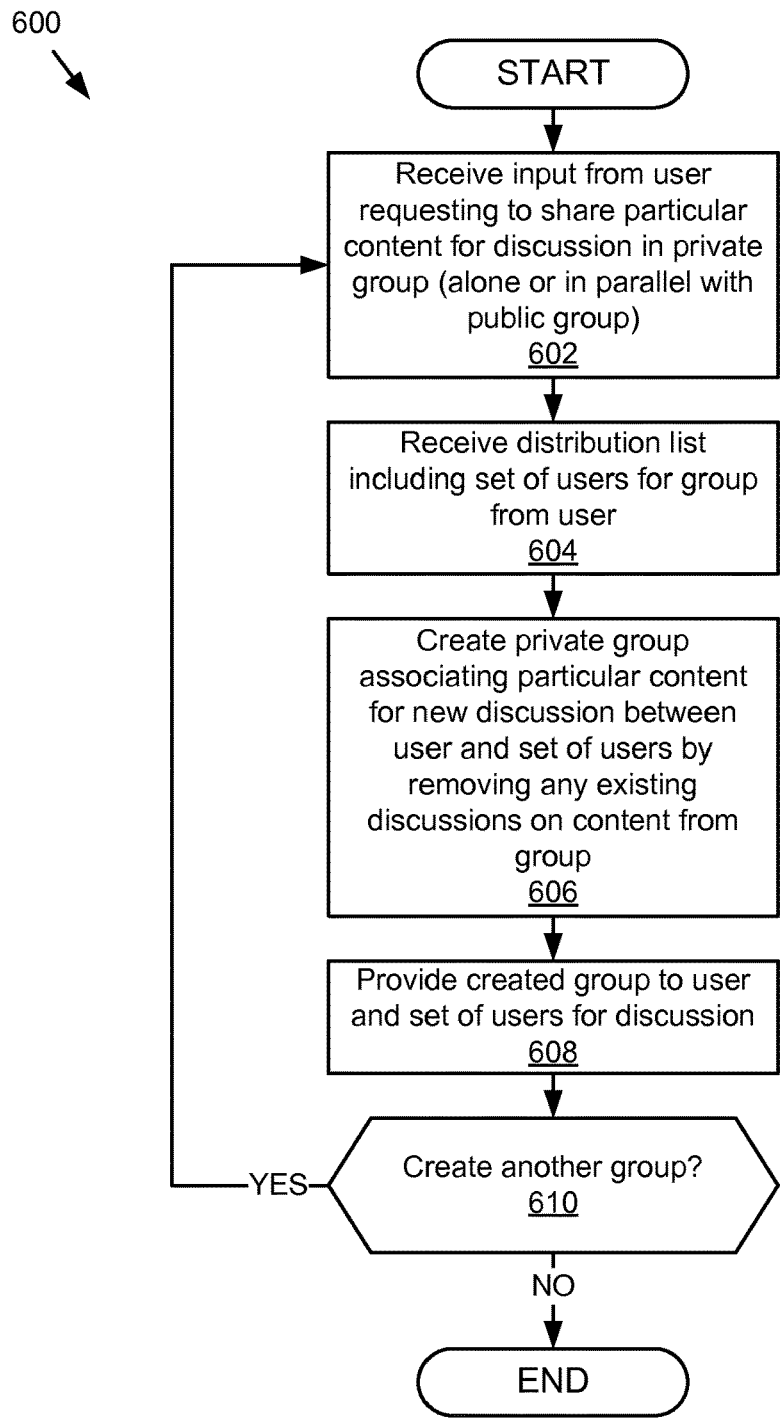
FIG. 6 is a flow chart of an example method for sharing a particular content with one or more groups for discussion by creating new channels of communication with no root content, only new discussion being displayed.

Referring now to FIG. 6, the method and operations indicated generally by reference numeral 600 begin at block 602, including one or more operations for receiving input from a reader or user for sharing particular content for discussion or viewing in a private group. The methods and operations 600 proceed to the next block 604 including one or more operations for receiving distribution lists including set of users for the groups identified by the reader or user who wishes to share the content. From that point, the methods and operations 600 proceed to the next block 606, which creates the private group and associates the particular content for a new discussion among the reader or user and the set of persons in the private group. At this point, any and all existing discussions relating to the particular content are removed from the discussion stream or thread, thereby initiating a new stream or thread distinct from any that existed before. From there the methods and operations 600 proceed to the next block 608, including one or more operations for providing the created group to the reader or user wishing to share content and the set of users with whom the reader wishes to discuss the content, i.e., the set of users for discussion. From there, the methods or operations 600 proceed to the next block 610, at which point the social reading platform 100 or application server 118 may query if another group for discussion is desired, and if the answer is affirmative, the methods and operations 600 proceed to block 602, from which point the operations are repeated. If the answer is negative, the methods and operations 600 end this routine or subroutine and proceed to whatever operations are designated next for operation of the social reading platform.

Figure 7:
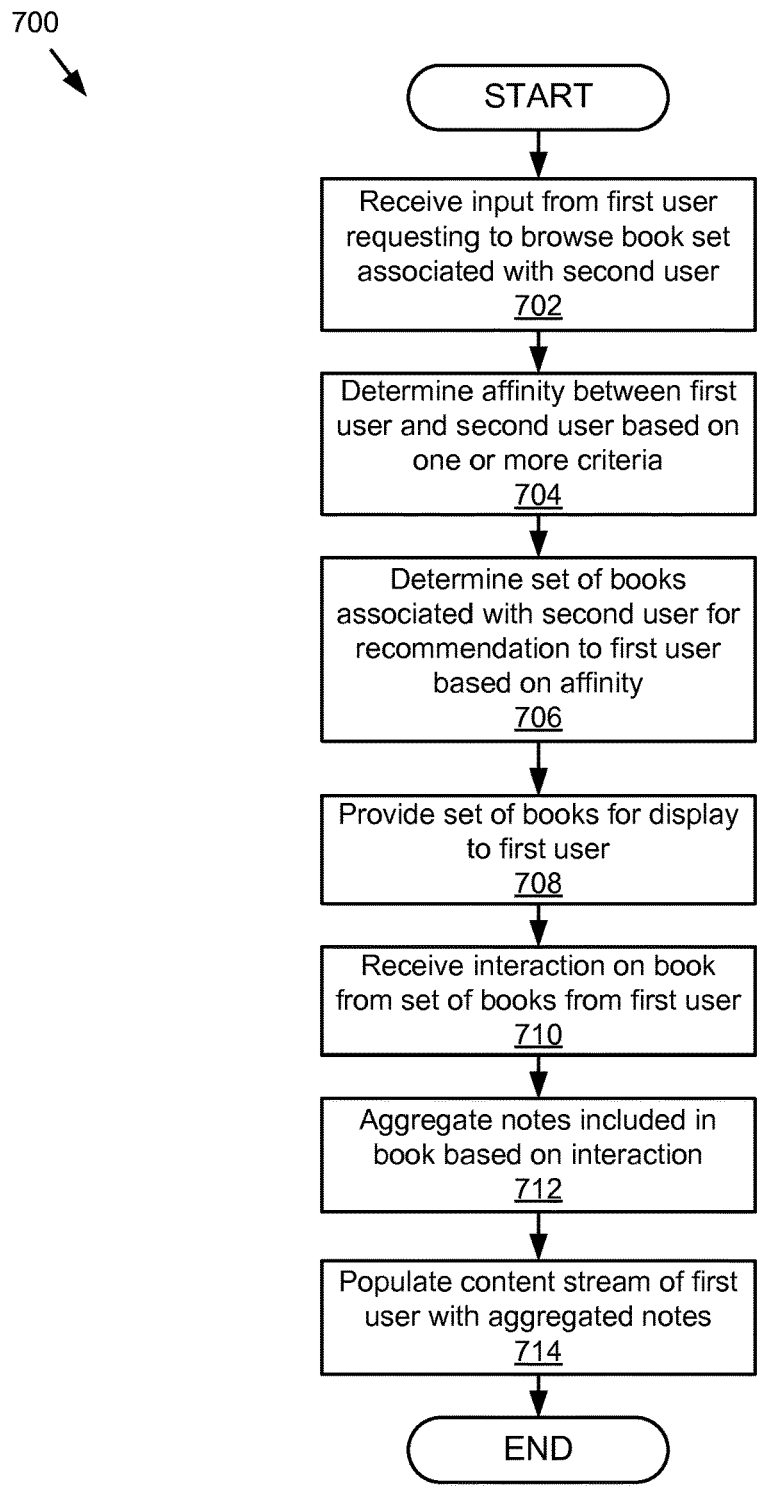
FIG. 7 is a flow chart of an example method for facilitating discovery of books or other electronic content by a user or reader of the social reading platform, for example, by using a user's or reader's social graph.

Referring now to FIG. 7, methods and operations indicated generally by reference numeral 700 begin and proceed to block 702, which represents one or more operations for receiving input from a first user requesting to browse a particular "bookset" associated with a second user. These operations are associated with the book or content discovery functionalities. The methods and operations 700 proceed to the next block 704 including one or more operations for determining affinity between the first user and the second user based on one or more criteria. From there the methods and operations 700 proceed to the next block 706 including one or more operations for determining one or more sets of books associated with the second user for recommendation to the first user based on affinity. The methods and operations 700 proceed to the next block 708 including one or more operations for providing the one or more sets of books for display to the first user. The methods and operations 700 proceed to the next block 710, at which point, one or more operations receive any interactions on a particular book from the set of books from first user. The methods and operations 700 proceed to the next block 712, which includes one or more operations for aggregating notes included in book based on the interactions. The methods and operations 700 proceed to the next block 714, at which stage, one or more operations populate a content stream of the first user with aggregated notes.

Figure 8:
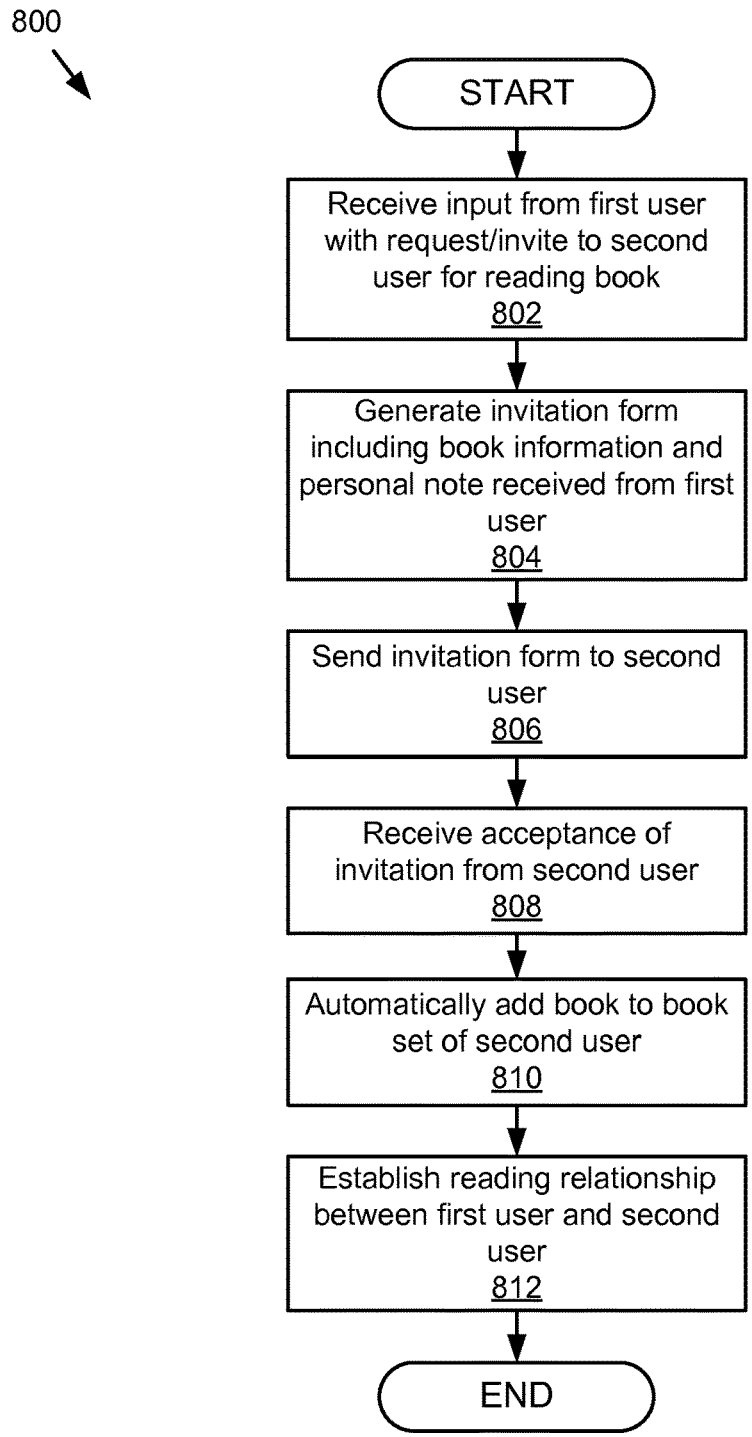
FIG. 8 is a flow chart of an example method for establishing collaborative reading or discussion relationships among two or more users of groups.

FIG. 8 illustrates example methods and operations for issuing invitations (operations performed by the invitation module). The methods and operations indicated generally by reference numeral 800 begin and proceed to block 802 including one or more operations for receiving input from a first user requesting an invite for a second user to join in reading a particular book. The methods and operations 800 proceed to the next block 804, which generates an invitation, for example, a form including information on the particular book and any personal notes received from first user. The methods and operations 800 proceed to the next block 806, which sends the invitation form to second user. The methods and operations 800 proceed to the next block 808, including one or more operations for receiving acceptance of an invitation from second user. The methods and operations 800 proceed to the next block 810 including one or more operations for automatically adding the particular book to the "bookset" of the second user. The methods and operations 800 proceed to the next block 812 including one or more operations for establishing a reading relationship between the first user and the second user.

Figure 9:
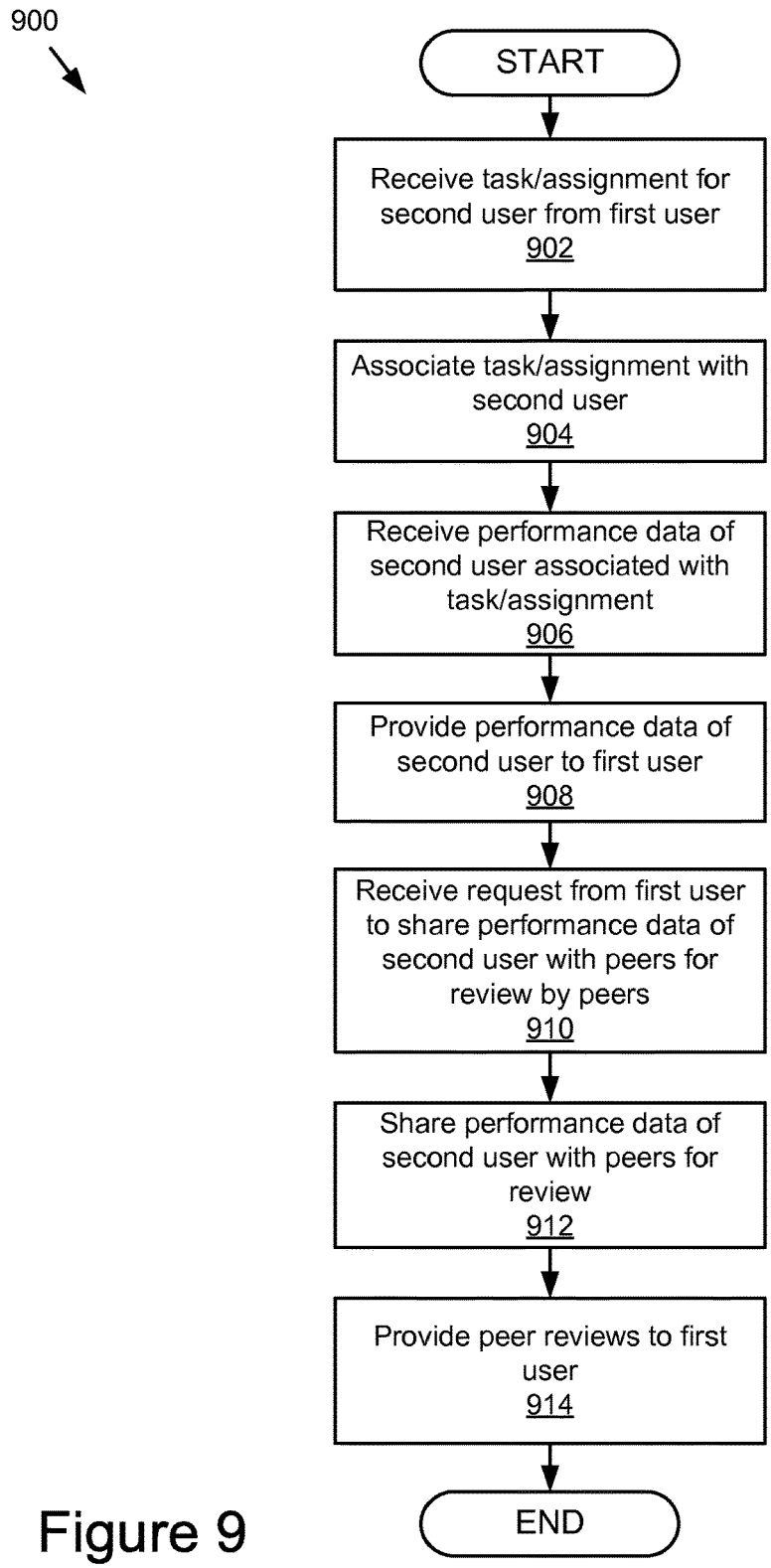
FIG. 9 is a flow chart of an example method for assigning tasks and facilitating review of performance by a user assigning the task or peers.

FIG. 9 illustrates the methods and operations involved with assigning a task or assignment from one user or reader to others. The methods and operations are designated generally by reference numeral 900 and begin at block 902, which includes one or more operations for receiving an assignment for a second user from a first user. The methods and operations 900 proceed to the next block 904, including one or more operations for associating the assignment with the second user. The methods and operations 900 proceed to the next block 906 including one or more operations for receiving performance data of the second user associated with the assignment. The methods and operations 900 proceed to the next block 908 including one or more operations for providing the performance data of the second user to the first user. The methods or operations 900 including one or more operations proceed to the next block 910 at which point the system or social reading platform 100 (via application server 118) receives a request from the first user to share the performance data of the second user with peers for review. The methods and operations 900 proceed to the next block 912, which includes one or more operations for sharing the performance data of the second user with peers for review. The methods and operations 900 proceed to the next block 914, at which stage the system provides peer reviews to the first user.

Figure 10A:
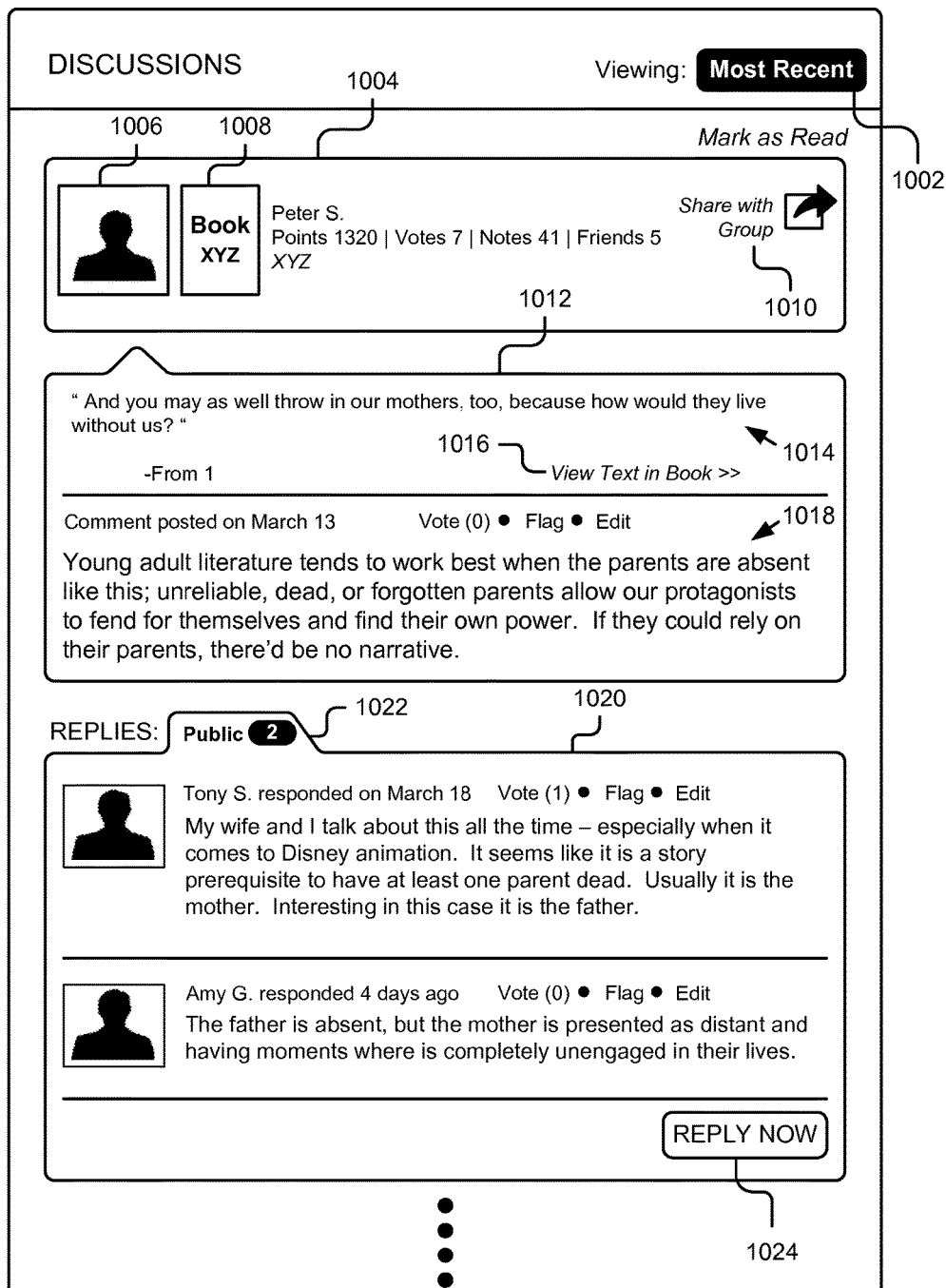
FIG. 10A is an example graphical user interface illustrating multiple window displays indicating a public discussion thread and sharing of content among users of the interactive organization application for use with social reading platforms.
Figure 10C:
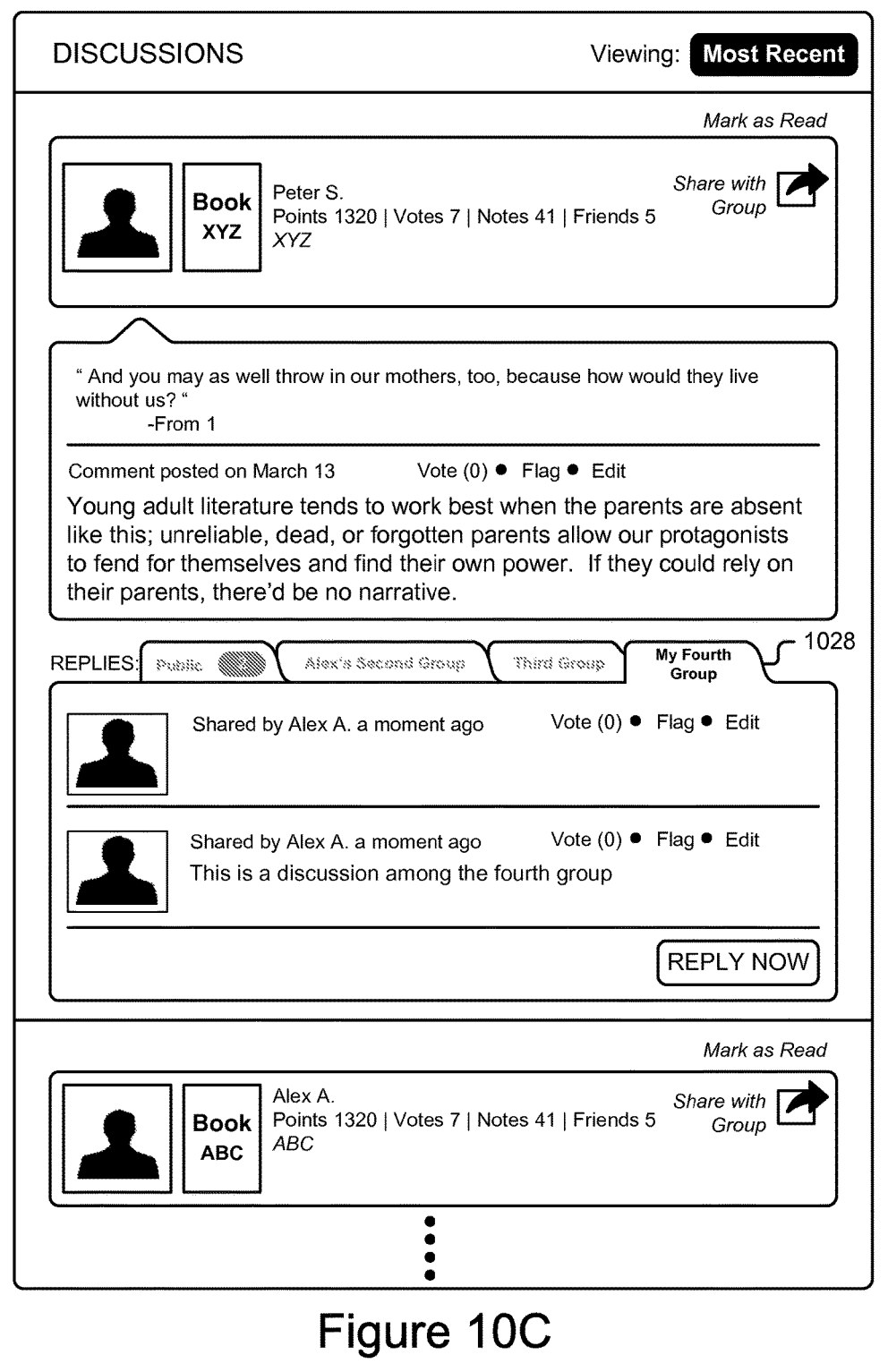

FIGS. 10A, 10B, and 10C illustrate various graphical display representations as they would appear on the display device 310 that any of the users 114a through 114n would see. FIG. 10A illustrates an example graphical user interface 1000 configured to display a window with multiple tabs, buttons, or icons. This example illustrates a "Most Recent" tab 1002, which a user 114 may press to view latest feeds or posts on his/her content stream. A window display with functionalities that facilitate sharing of content indicated by reference numeral 1004 illustrates an example of a user named "Peter S," who shares particular content from a book "XYZ" with groups, public and private. The tab 1004 includes an example user indicated by reference numeral 1006, an example book "XYZ" 1008 that the user decides to share with certain groups and a sharing tab, "Share with Group," which is indicated by reference numeral 1010. The window display 1004 also indicates other meta data associated with the user, for example, points (in this instance 1320), votes (in this instance 7), notes (in this instance 41), Friends (in this instance 5). Another window display 1012 may be configured for displaying data relating to notes created for particular content of the book. As examples, this window 1012 display a particular content 1014 from the book 1008 and an example note taken by the user 1006, the example note as indicated by reference numeral 1018. The window display 1012 also includes a link tab 1016, by which a user 114 may select to view the particular content 1014 from the book 1008. Yet another window display 1020 may be configured to display replies 1022 posted in a public stream, which may be viewed by all. A user 114 may continue a discussion by pressing a tab 1024 to provide further answers to replies provided by others. The window display 1020 also displays a user name, a date on which the user's reply was posted, and options provided to a user to provide further feedback by either, voting, flagging, or editing the particular content.

FIG. 10B illustrates another example of the graphical representation display in the instance of a discussion with a private group created by a user 114. In this example, the window display 1020 may include indications that are displayed when a particular user is in a discussion with a private group. In this example, indications include a user's (e.g., "Alex") second group 1026. This window display may also indicate that the user has a parallel public discussion in session as indicated by a public tab 1022 also illustrated. Only users or readers who are members of the private group may see all communications or discussions streams that occur among the private group members. These discussion streams are restricted for viewing by any others who are not part of the private group. Therefore, persons of the public who are privy to a public discussion stream may not see the discussion occurring in a private stream.

FIG. 10C is a graphical representation of an example display also comprising multiple windows similar to the prior FIGS. (10A and 10B) with an additional window display configured to show or publish that a user may create multiple private groups for discussion of similar or disparate content. For example, when an indexed note is published or displayed, the note's author may either designate that note "private," or more commonly, share it with one or more groups. A "share" may be thought of as a distribution list, and defines which groups may access or view the "root" note (i.e. the first note that appears in a discussion thread). Each of these shares is also partitioned, restricted, or concealed from one another, such that continuation of the discussion in one share will not be visible in another. The initial shares also define the default distribution (shares) of any replies to the root note.

Any user who has access to a note may opt to create a new branch in the discussion thread or stream by specifying one or more new shares, distributed to selected groups of which the user is a member. These new shares effectively create new partitions or channels of communication in the discussion, whereby subsequent participations or channels of communication in each may be done only by members of the designated group. Also, even when the root note has a public distribution, there may be several additional branches of replies, each of which has their own distribution characteristics. There is the notion of restricted users in any community. A restricted user, typically a student or child, may be defined as one who has neither access nor exposure to the "Public" distribution group, and would not initially see a note with a public distribution. However, other (unrestricted) users in the restricted user's social circle (teachers, parents) may create shares such that the restricted user is exposed to public content in a curated and controlled manner.

When an unrestricted user shares a public note or thread, the note as well as replies to the note are inserted into their feed and a new discussion tab is created for this set of users. At this point, the restricted user sees one discussion tab for their private group, while the unrestricted user who shared the note has two discussion tabs with one for the group and one for public.

Figure 11:
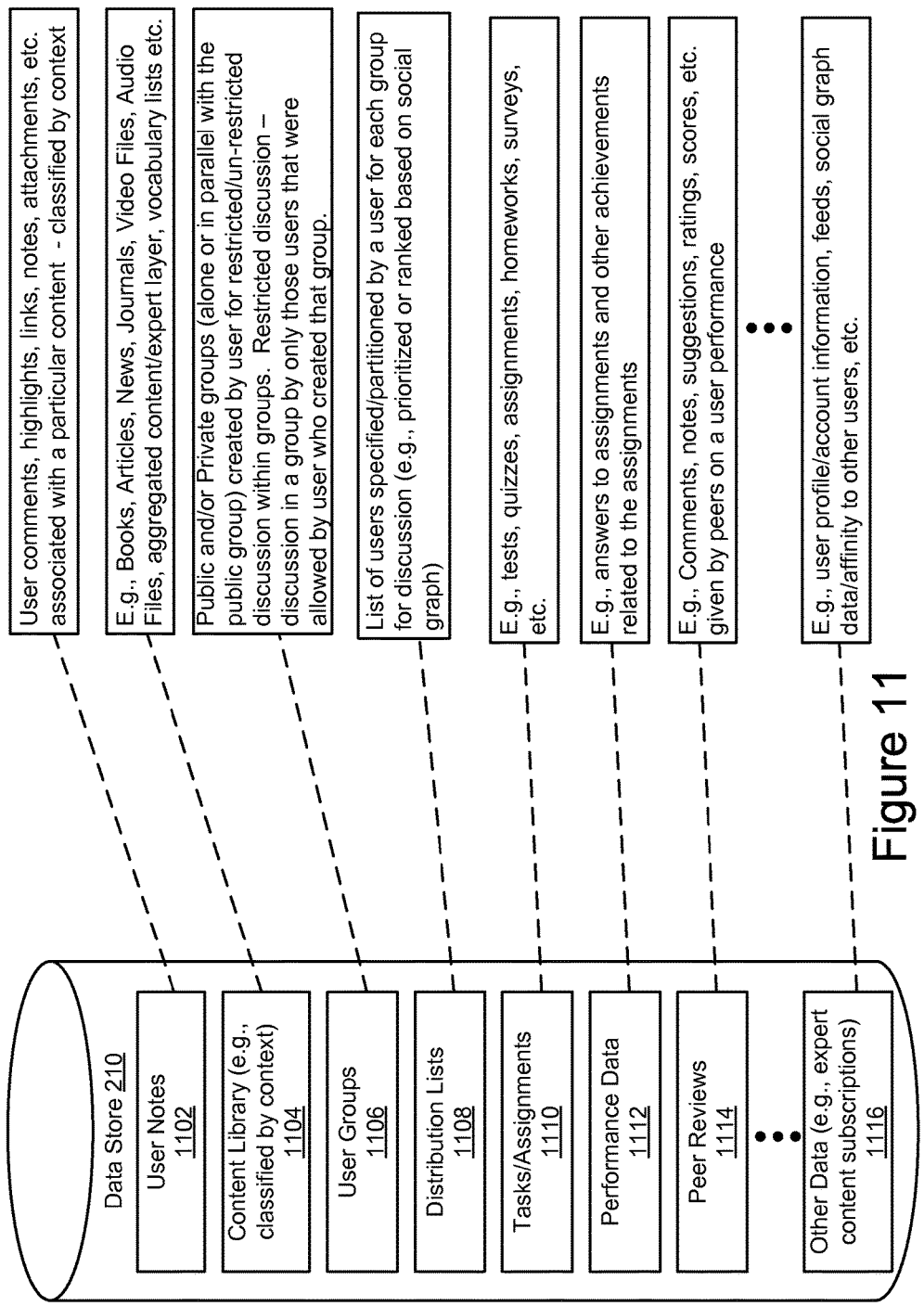
FIG. 11 is an example data storage configuration diagram illustrating different data and/or entities that are being stored in accordance with the present invention.

FIG. 11 illustrates an example configuration of data storage 210. The data storage 210 may include a section 1102 with user notes, a section 1104 with content library, a section 1106 with user groups, a section 1108 with distribution lists, a section 1110 with tasks/assignments, a section 1112 with performance data, a section 1114 with peer reviews, as well as a section 1116 for other types of data that may be desired. As one example, the user notes 1102 may include "user comments, highlights, links, notes, attachments, etc. associated with a particular content—classified by context". As an example, the content library 1104 may include "books, articles, news, journals, video files, audio files, aggregated content/expert layer, vocabulary lists, etc." As an example, the user groups 1106 may include "public and/or private groups (alone or in parallel with the public group) created by user for restricted/un-restricted discussion within groups. The restricted discussion being discussion in a group by only those users that were allowed by user who created that group". As an example, the distribution lists 1108 may include "list of users specified/partitioned by a user for each group for discussion (e.g., prioritized or ranked based on social graph)". As an example, the tasks/assignments 1110 may include "tests, quizzes, assignments, homework, surveys, etc." As an example, the performance data 1112 may include "answers to assignments and other achievements related to the assignments". As an example, the peer reviews 1114 may include "comments, notes, suggestions, ratings, scores, etc. given by peers on a user performance". As an example, the other data 1116 may further include "user profile/account information, feeds, social graph data/affinity to other users, etc.

In the preceding description, for purposes of explanation, numerous specific details have been set forth in order to provide a thorough understanding this technology. It will be apparent, however, that this technology can be practiced without some of these specific details that are disclosed here. In other instances, structures and devices have been shown in block diagram form in order to avoid obscuring the innovative aspects. For example, the present technology is described in some implementations above with reference to particular hardware and software, yet it is not limited to only the particular hardware and software referenced.

Reference in the specification to "one implementation or embodiment" or "an implementation or embodiment" simply means that a particular feature, structure, or characteristic described in connection with the implementation or embodiment is included in at least one implementation or embodiment of the technology described. The appearances of the phrase "in one implementation or embodiment" in various places in the specification are not necessarily all referring to the same implementation or embodiment.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present inventive technology be limited not by this detailed description, but rather by the claims of this application. As will be understood by those familiar with the art, the present inventive technology may be embodied in other specific forms without departing from the spirit or essential characteristics thereof. Likewise, the particular naming and division of the modules, routines, features, attributes, methodologies and other aspects are not mandatory or significant, and the mechanisms that implement the present inventive technology or its features may have different names, divisions and/or formats. Furthermore, as will be apparent to one of ordinary skill in the relevant art, the modules, routines, features, attributes, methodologies and other aspects of the present inventive technology can be implemented as software, hardware, firmware or any combination of the three. Also, wherever a component, an example of which is a module, of the present inventive technology is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present inventive technology is intended to be illustrative, but not limiting, of the scope of the present invention, which is set forth in the following claims.

What is claimed is:

1. A method, comprising:

creating a data-interactive application and providing said data-interactive application within a shared platform, said shared platform including one or more computing devices, by which data describing actions performed by a plurality of users is received over a network within said shared platform via said data-interactive application;

configuring said shared platform to be accessible by said plurality of users via said data-interactive application, by one or more computing devices of said shared platform, the data-interactive application within said shared platform and accessible asynchronously by said plurality of users over said network, said data-interactive application installed on the shared platform to receive said data describing actions variously performed by said plurality of users, the shared platform containing a content-organization engine coupled to said data-interactive application to execute said data describing said actions variously performed by said plurality of users;

receiving, by the one or more computing devices of said shared platform, via said data-interactive application within the shared platform, certain content created by said data describing actions performed by a particular user from the plurality of users, relating to particular text within electronic content stored within said shared platform and providing for display by the content-organization engine said electronic content in the form of a book, for viewing by another user over the network at a remote device, and embedding the certain content created by said one user within a page in the book;

sharing automatically, by the one or more computing devices within said shared platform and the content-organization engine, the certain content created by the user with groups of other users as designated by a sharing engine coupled to the content-organization engine, wherein the certain content is provided for display to one or more groups of users on at least said remote device, if the one or more groups are designated for viewing said certain content added by said particular user and when the one or more groups review the electronic content stored within said shared platform;

creating automatically by the content-organization engine, and by the one or more computing devices of shared platform, a master identification code for identifying all versions of the electronic content and providing the certain content created by the particular user by said data describing said actions performed by said particular user for display by a graphical user interface with multiple windows displaying all the versions of the electronic content stored within said shared platform;

generating by the content-organization engine and providing for display by the graphical user interface and via said multiple windows, and by at least one of the one or more computing devices of said shared platform, multiple channels for multiple threads of discussion created for different groups based on restrictions designated and starting a new channel for a new thread of discussion for a private group without including previous discussions;

generating, by the content-organization engine and by the one or more computing devices of said shared platform, a chapter map for the electronic content stored within the shared platform, by which the certain content created by the particular user and provided to others is selectively located in an appropriate version of the electronic content identified from all the versions of the electronic content and wherein if the certain content created by the particular user defines an assignment, answers from other users responding to the assignment are compiled for review by the particular user providing the assignment; and providing a content discovery system as part of the content-organization engine and configured to allow certain users to browse through lists of materials compiled by other users based on established relationships and discover content that may be of interest.

2. The method of claim 1, further comprising:
generating, by the one or more computing devices of the shared platform, an identification of coordinates of where the electronic content is located in the appropriate version identified from all the versions of the electronic content stored on said shared platform.

3. The method of claim 1, wherein the content discovery system includes a book discovery system configured to allow users to browse through shelves of friends and discover books that may be of interest in response to invitations issued by the friends.

4. The method of claim 1, wherein the content is at least one of a group of a comment, a link, a poll, or assignment relating to the particular text which is highlighted at a particular location in the electronic content.

5. The method of claim 1 wherein the book discovery system is configured to formulate and present one or more invitations by a particular user to other users to join in reading the book and the invitation automatically generates a form that includes book information and a personal note that is sent to a recipient by at least one of an email, an app and social media and when a recipient of the invitation accepts the invitation, a sample of the book is automatically added to a bookshelf of the recipient and a reading relationship is automatically established between the user issuing an invitation and the recipient.

6. The method of claim 1, wherein the answers to the assignment are further provided to other peer users for review.

7. The method of claim 1, wherein the groups of other users are determined based on criteria including social affinity.

8. The method of claim 1, wherein the groups of other users are prioritized based on a social graph for the user creating the content.

9. A non-transitory computer readable medium having computer program instructions recorded thereon for interactive organization of comments on any asynchronous social reading platform, wherein the computer program instructions when executed on a computer cause the computer to:

install a data-interactive application on said asynchronous social reading platform;

configure said asynchronous social reading platform to be accessible by a plurality of users via said data-interactive application, the data-interactive application within said asynchronous social reading platform accessible asynchronously by a plurality of users over a network, the data-interactive application containing a content-organization engine and executing receiving of data describing actions performed by said plurality of users;

receive within the asynchronous social reading platform, said data describing various actions performed by said plurality of users including content created by a particular user relating to particular text within electronic content and provide for display by the content-organization engine in the form of a book, for viewing by another user over the network on a remote device, and embed the content within a page in the book;

share automatically by a sharing engine of said data-interactive engine coupled to the content-organization engine, the content created by said particular user with groups of other users as designated, wherein the content is provided for display to one or more groups of users if the one or more groups are designated by the sharing engine for viewing when the one or more groups review the electronic content;

create by the content-organization engine, a master identification code for identifying all versions of the electronic content and providing the content created by the particular user for display within all the versions of the electronic content;

generate by the content-organization engine and provide for display by a graphical user interface within the data-interactive application, multiple channels for multiple threads of discussion created for different groups based on restrictions designated and starting a new channel for a new thread of discussion for a private group without previous discussions;

generate by the content-organization within the data-interactive application, a chapter map for the electronic content, by which the content created and provided by the particular user is located in an appropriate version of all the versions of the electronic content and wherein if the content created by the user is an assignment, answers from other users responding to the assignment are received for review by the user providing the assignment; and provide a content discovery system within the content-organization engine of the data-interactive application configured to allow certain users to browse through lists of materials compiled by other users based on established relationships and discover content that may be of interest.

10. The non-transitory computer readable medium of claim 9, wherein the computer instructions when executed on a computer further causes the computer to:
generate an identification of coordinates of a location of the electronic content in the appropriate version from all the versions of the electronic content.

11. The non-transitory computer readable medium of claim 10 further including a book discovery system configured to allow users to browse through shelves of friends and discover books that may be of interest.

12. The non-transitory computer readable medium of claim 9, wherein the content is at least one of a group of a comment, a link, a poll, or assignment relating to the particular text which is highlighted at a particular location in the electronic content.

13. The non-transitory computer readable medium of claim 9, wherein the computer instructions when executed on the computer further causes the computer to:

execute the book discovery system to formulate and present one or more invitations by a particular user to other users to join in reading the book and the invitation automatically generates a form that includes book information and a personal note that is sent to a recipient by at least one of an email, an app and social media and when a recipient of the invitation accepts the invitation, a sample of the book is automatically added to a bookshelf of the recipient and a reading relationship is automatically established between the user issuing an invitation and the recipient.

14. The non-transitory computer readable medium of claim 9, wherein the answers to the assignment for review by the user creating the content are provided for review to other peer users.

15. The non-transitory computer readable medium of claim 9, wherein the groups of other users are determined based on criteria including social affinity.

16. The non-transitory computer readable medium of claim 9, wherein the groups of other users are prioritized based on a social graph for the user creating the content.

17. A system, comprising:

one or more processors coupled and configured to form a shared platform accessible to a plurality of users by asynchronous connections over a network; and a memory storing instructions that, when executed, cause the one or more processors to: provide and install a data-interactive application on said shared platform; configure the data interactive application on the shared platform to execute operations, the shared platform further comprising:

a content-organization engine within said shared platform adapted to receive via the data-interactive application, content created by a user relating to particular text within electronic content provided for display in the form of a book, for viewing by another user over the network, wherein the content is provided within a page in the book;

a sharing engine within said shared platform coupled to the content-organization engine and adapted to configure the content-organization engine to share the content with groups of other users as designated by the sharing engine, wherein the content is provided for display by a graphical user interface to one or more groups of users if the one or more groups are designated for viewing and when the one or more groups review the electronic content;

the content-organization engine within said shared platform adapted to create a master identification code for identifying all versions of the electronic content and providing the content created by the user for display with all the versions of the electronic content;

the content-organization engine coupled to the graphical user interface with multiple windows to generate and provide for display multiple channels with multiple threads of discussion for different groups based on restrictions designated and starting a new channel with a new thread of discussion for a private group without previous discussions;

the content-organization engine adapted to generate a chapter map for the electronic content, by which the content created and provided by the user is located in an appropriate version of all the versions of the electronic content and wherein if the content created by the user is an assignment, answers from other users responding to the assignment are received for review by the user providing the assignment; and a content discovery system within the content-organization engine configured to allow certain users to browse through lists of materials compiled by other users based on established relationships and discover content that may be of interest.

18. The system of claim 17, wherein the memory stores further instructions that when executed cause the computer to:

generate coordinates for the location in the electronic content in the particular version from all the versions of the electronic content.

19. The system of claim 17, further including a book discovery system in the content discovery system configured to allow users to browse through shelves of friends and discover books that may be of interest.

20. The system of claim 17, wherein the content is at least one of a group of a comment, a link, a poll, or assignment relating to the particular text which is highlighted at a particular location in the electronic content.

21. The system of claim 17, wherein the memory stores further instructions that when executed cause the computer to:

execute the content discovery system including a discovery system to formulate and present one or more invitations by a particular user to other users to join in reading the book and the invitation automatically generates a form that includes book information and a personal note that is sent to a recipient by at least one of an email, an app and social media and when a recipient of the invitation accepts the invitation, a sample of the book is automatically added to a bookshelf of the recipient and a reading relationship is automatically established between the user issuing an invitation and the recipient.

22. The system of claim 17, wherein the answers to the assignment for review are provided to other peer users.

23. The system of claim 17, wherein the groups of other users are determined based on criteria including social affinity.

24. The system of claim 17, wherein the groups of other users are prioritized based on a social graph for the user creating the content.

* * * * *